United States Patent
Suzuki et al.

(10) Patent No.: US 7,233,581 B2
(45) Date of Patent: Jun. 19, 2007

(54) DIGITAL RADIO COMMUNICATION SYSTEM FOR MULTI-APPLICATION

(75) Inventors: Hideya Suzuki, Ichikawa (JP); Nobukazu Doi, Hachioji (JP); Tomoaki Ishifuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 718 days.

(21) Appl. No.: 09/810,550

(22) Filed: Mar. 19, 2001

(65) Prior Publication Data

US 2002/0006120 A1   Jan. 17, 2002

(30) Foreign Application Priority Data

Jul. 12, 2000   (JP)   ............................. 2000-215880

(51) Int. Cl.
*H04Q 7/00*   (2006.01)
(52) U.S. Cl. ...................................... 370/329; 370/337
(58) Field of Classification Search ................ 370/329, 370/336, 337, 338, 347, 348, 401
See application file for complete search history.

(56) References Cited

U.S. PATENT DOCUMENTS

| | | | |
|---|---|---|---|
| 5,436,906 A | | 7/1995 | Kasuya et al. |
| 5,557,608 A | * | 9/1996 | Calvignac et al. ............ 370/389 |
| 5,570,411 A | * | 10/1996 | Sicher ........................ 455/450 |
| 5,614,914 A | * | 3/1997 | Bolgiano et al. ............. 342/364 |
| 5,742,592 A | * | 4/1998 | Scholefield et al. .......... 370/329 |
| 5,862,485 A | * | 1/1999 | Linneweh et al. ............ 455/450 |
| 5,952,940 A | | 9/1999 | Matsumoto |
| 6,067,457 A | * | 5/2000 | Erickson et al. ............. 455/512 |
| 6,208,865 B1 | * | 3/2001 | Veerasamy ................... 455/450 |
| 6,539,227 B1 | * | 3/2003 | Jetzek et al. ................. 455/442 |
| 6,597,920 B2 | * | 7/2003 | Yegani et al. ................ 455/512 |
| 6,600,914 B2 | * | 7/2003 | Uhlik et al. ............... 455/404.1 |
| 6,704,577 B1 | * | 3/2004 | Hughes ....................... 455/515 |
| 6,771,627 B1 | * | 8/2004 | Wyrwas ....................... 370/337 |
| 6,816,500 B1 | * | 11/2004 | Mannette et al. ........... 370/431 |

FOREIGN PATENT DOCUMENTS

| | | |
|---|---|---|
| EP | 1005243 | 5/2000 |
| JP | 06224837 | 8/1994 |
| JP | 06244781 | 9/1994 |
| JP | 11331928 | 11/1999 |

\* cited by examiner

*Primary Examiner*—Huy D. Vu
*Assistant Examiner*—Christine Ng
(74) *Attorney, Agent, or Firm*—Mattingly, Stanger, Malur & Brundidge, P.C.

(57) ABSTRACT

A time slot for a connection request sent from a mobile station includes the mobile station ID and the application discrimination word of the object application for which the mobile station requests the connection. By referring to the database, a base station assigns a MDC preferentially to a mobile station issuing a connection request for calling a high priority application. The base station monitors the MDCs used for ongoing communications. If a MDC assigned to a mobile station does not satisfy a predetermined radio communication quality, other MDCs for lower priority application are freed and reassigned to the mobile station. A plurality of MDCs including the reassigned MDCs into which the same contents are encapsulated are transmitted to the mobile station.

2 Claims, 11 Drawing Sheets

| APPLICATION DISCRIMINATION WORD | PRIORITY |
|---|---|
| AP1 | 1 |
| AP1 | 1 |
| AP2 | 2 |

402

| TIME SLOT | MOBILE STATION ID | APPLICATION DISCRIMINATION WORD | PRIORITY |
|---|---|---|---|
| TSD1 | MID1 | AP1 | 1 |
| TSD2 | MID2 | AP1 | 1 |
| TSD3 | MID3 | AP2 | 2 |
| TSD4 | MID1 | AP2 | 2 |
| TSD5 | MID4 | AP3 | 3 |

403

| TURN | PRIORITY | MOBILE STATION ID | APPLICATION DISCRIMINATION WORD | ADDRESS |
|---|---|---|---|---|
| 1 | 3 | MID1 | AP3 | 10000H |
| 2 | 3 | MID2 | AP3 | 10100H |
| 3 | – | – | – | – |

404

| MOBILE STATION ID | APPLICATION DISCRIMINATION WORD | PRIORITY | RECEIVED MDC TIME SLOTS | ERROR COUNT | ERROR RATIO |
|---|---|---|---|---|---|
| MID1 | AP1 | 1 | 3 | 2 | 0.67 |
| MID1 | AP2 | 2 | 2 | 0 | 0.0 |
| MID1 | AP3 | 3 | 0 | 0 | 0 |
| MID2 | AP1 | 1 | 1 | 0 | 0.0 |
| MID2 | AP3 | 3 | 0 | 0 | 0 |
| MID3 | AP2 | 2 | 2 | 1 | 0.5 |
| MID4 | AP3 | 3 | 3 | 1 | 0.33 |
| – | – | – | – | – | – |

| TIME SLOT | MOBILE STATION ID | APPLICATION DISCRIMINATION WORD | PRIORITY |
|---|---|---|---|
| TSD1 | MID1 | AP1 | 1 |
| TSD2 | MID2 | AP1 | 1 |
| TSD3 | MID3 | AP2 | 2 |
| TSD4 | MID1 | AP2 | 2 |
| TSD5 | MID5 | AP1 | 1 |

803

| TURN | PRIORITY | MOBILE STATION ID | APPLICATION DISCRIMINATION WORD | ADDRESS |
|---|---|---|---|---|
| 1 | 3 | MID4 | AP3 | 10200H |
| 2 | 3 | MID1 | AP3 | 10000H |
| 3 | 3 | MID2 | AP3 | 10100H |
| 4 | – | – | – | – |
| 5 | – | – | – | – |

| TIME SLOT | MOBILE STATION ID | APPLICATION DISCRIMINATION WORD | PRIORITY |
|---|---|---|---|
| TSD1 | MID1 | AP1 | 1 |
| TSD2 | MID2 | AP1 | 1 |
| TSD3 | MID3 | AP2 | 2 |
| TSD4 | MID1 | AP1 | 1 |
| TSD5 | MID1 | AP1 | 1 |

1002

| TURN | PRIORITY | MOBILE STATION ID | APPLICATION DISCRIMINATION WORD | ADDRESS |
|---|---|---|---|---|
| 1 | 2 | MID1 | AP2 | 10200H |
| 2 | 3 | MID4 | AP3 | 10300H |
| 3 | 3 | MID1 | AP3 | 10000H |
| 4 | 3 | MID2 | AP3 | 10100H |
| 5 | - | - | - | - |

| APPLICATION CLASSITICATION | PRIORITY |
|---|---|
| AP1 | 1 |
| AP2 | 2 |
| AP3 | 3 |

1201-B

| APPLICATION CLASSITICATION | PRIORITY |
|---|---|
| AP1 | 2 |
| AP2 | 2 |
| AP3 | 3 |

DIGITAL RADIO COMMUNICATION SYSTEM FOR MULTI-APPLICATION

BACKGROUND OF THE INVENTION

The present invention relates to a digital radio transmission method for multi-applications, making it possible to accommodate a plurality of mobile terminals and provide a plurality of applications.

A personal Digital Cellular (PDC) and a Personal Handyphone System (PHS) are currently available as digital radio communication systems. These systems adopt a Time Division Multiple Access (TDMA) method. This TDMA method operates as follows. A given channel is sectioned into time units called frames in the direction along time axis. Each frame is divided into time units called time slots. A base station assigns one of the time slots to a mobile station which is located within its service area and has requested use of a communication service. Then, the base station communicates with the mobile station within the time unit, called the time slot, that has been assigned to the mobile station every frame period. Generally, one time slot within one frame is assigned to one mobile station. As long as the communication service between the base station and the mobile station continues, that time slot is not assigned to any other mobile station to extend a communication service to another mobile station. This is because the TDMA was originally designed on a voice communication basis to provide a continuous data communication service. One time slot is considered sufficient to provide the communication channel capacity required for voice communication.

Meanwhile, a related technique has been disclosed in Japanese Patent Laid-Open Publication No. Hei 6-244791. In the radio communication method described in this publication, if a channel of poor radio communication quality is detected, a plurality of time slots, not one, are re-assigned to the mobile station using that channel, and the same signal data is encapsulated into these time slots and is transmitted to the mobile station. This method is designed to enhance data throughput at the receiving end by giving the receiving end the opportunity for receiving the same signal data multiple times.

As the area of multimedia has been entered, in the radio communications world as well, service-class-adaptive radio communication methods, such as Multimedia Mobile Access Communication (MMAC) high-speed radio access systems are currently being studied.

SUMMARY OF THE INVENTION

The above MMAC high-speed radio access is a radio communication system for multi-application. This system, however, has no arrangement for applications for which the communication between a base station and a mobile station should be completed during the time the mobile station is located in the cell of the base station. For example, an Electronic Toll Collection (ETC) system is a system in which the transfer of toll collection (charging) information between a base station and a mobile station should be completed during the time the mobile station is located in the cell of the base station. If the radio communication system of MMAC high-speed radio access is applied to an application for which the communication between a base station and a mobile station should be completed while the mobile station is located in the cell of the base station, it is supposed that a radio communication channel satisfying QOS is not assigned to the mobile station, and so it becomes difficult to complete such a communication.

The present invention aims to solve the above-described problem and provide a base station with a means of assigning a radio communication channel preferentially to a mobile station that is requesting an application, such as the above-mentioned ETC system for which a communication should be completed while the mobile station is located in the cell of the base station. In addition, the invention provides the base station with a radio communication channel measuring means. As a result of the measurement performed by this means, if a radio communication channel of poor quality is detected, its throughput is enhanced by re-assigning a plurality of time slots to the mobile station using that channel and encapsulating the same data contents into the plurality of time slots. This technique is applied to reduce the uncompleted communication rate of a communication for such application between a base station and a mobile station located in the cell of the base station.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to illustrate the principles of the invention.

DESCRIPTION OF THE PREFERRED EMBODIMENTS

Figure 1:
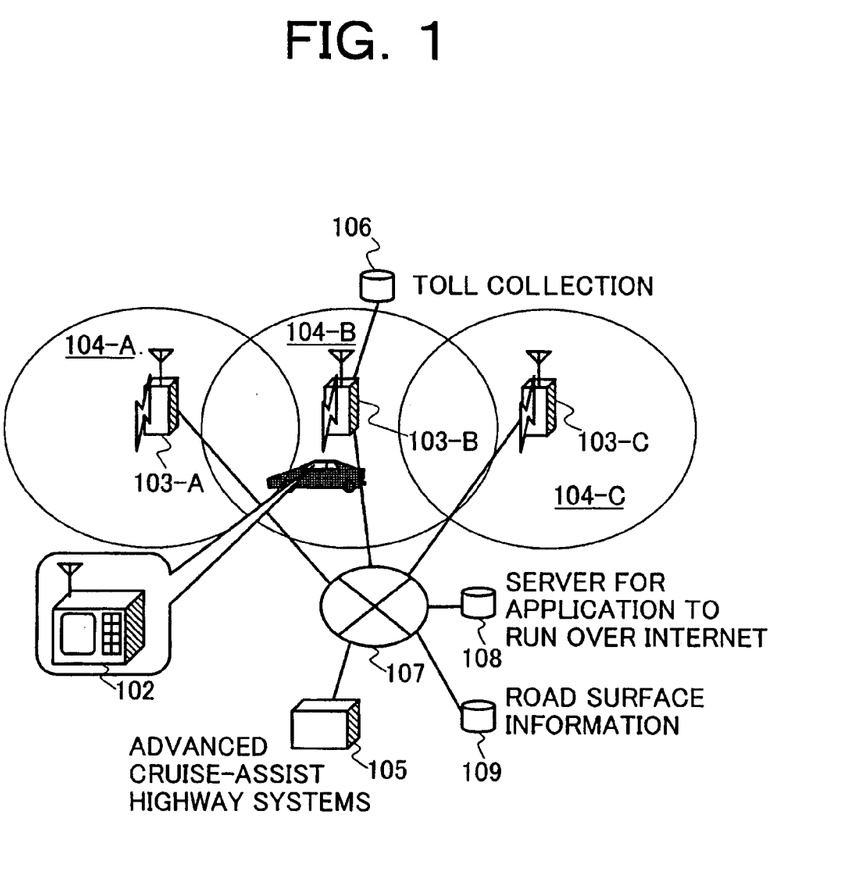
FIG. 1 is a diagram which shows an example of the digital radio communication system of the present invention.

FIG. 1 shows an example of a digital radio communication system to which the present invention is applied. In this system, a mobile station 102 is mounted on a motor vehicle 101. Three base stations 103-A, B, C offer four applications. The three base stations 103-A, B, C each have corresponding cells 104-A, B, C. The three base stations 103-A, B, C are connected to an Advanced Cruise-Assist Highway Systems application center 105, a server for an application to offer road information 109, and a server for an application to operate over the internet 108 via a wired network 107. A toll collection application server 106 is connected to only the base station 103-B and thus it can offer service only in the cell 104-B of the base station 103-B. A noticeable feature of this example is that a plurality of applications coexist.

As an essential factor for the digital radio communication system to run these applications in a compatible way, it is required to make arrangements for communication channel assignments to cover the characteristics of the applications. By way of example, the applications are roughly classified into four types, according to the communication channel characteristics.

A first communication channel type is "broadcast"; only the forward link is used for broadcasts. In general, the function of this channel is equivalent to broadcasting and the application to be offered over this channel is paging of the same contents to all mobile stations staying in the cell of the base station, which corresponds to the above-mentioned road information offering application.

A second communication channel type is "real-time"; this always provides constant channel capacity for bidirectional communication, typically, voice communication. For the "real-time" channel, a constant time slot is always assigned fixedly to a mobile station to perform such communication, and a conceivable application to be offered over this channel is Advanced Cruise-Assist Highway Systems that send motor vehicle control information to a mobile station and receive a response.

A third communication channel type is request; a server offers information over the forward link in response to an on-demand request as, for example, for some applications to operate over the internet. The allowable delay of the "request" channel is relatively long relative to other communication channels. Thus, the priority of time slot assignment of this channel can be set lower than other channels.

The last channel type is "transaction"; the communication over this channel between a base station and a mobile station must be completed while the mobile station is located in the cell of the base station. The "transaction" channel is used for such application as the above-mentioned ETC. For this application, the transfer of toll collection (charging) information between the base station that connects to the toll collection server and the mobile station must be completed during time of the mobile station is located in the cell of the base station.

Figure 2:
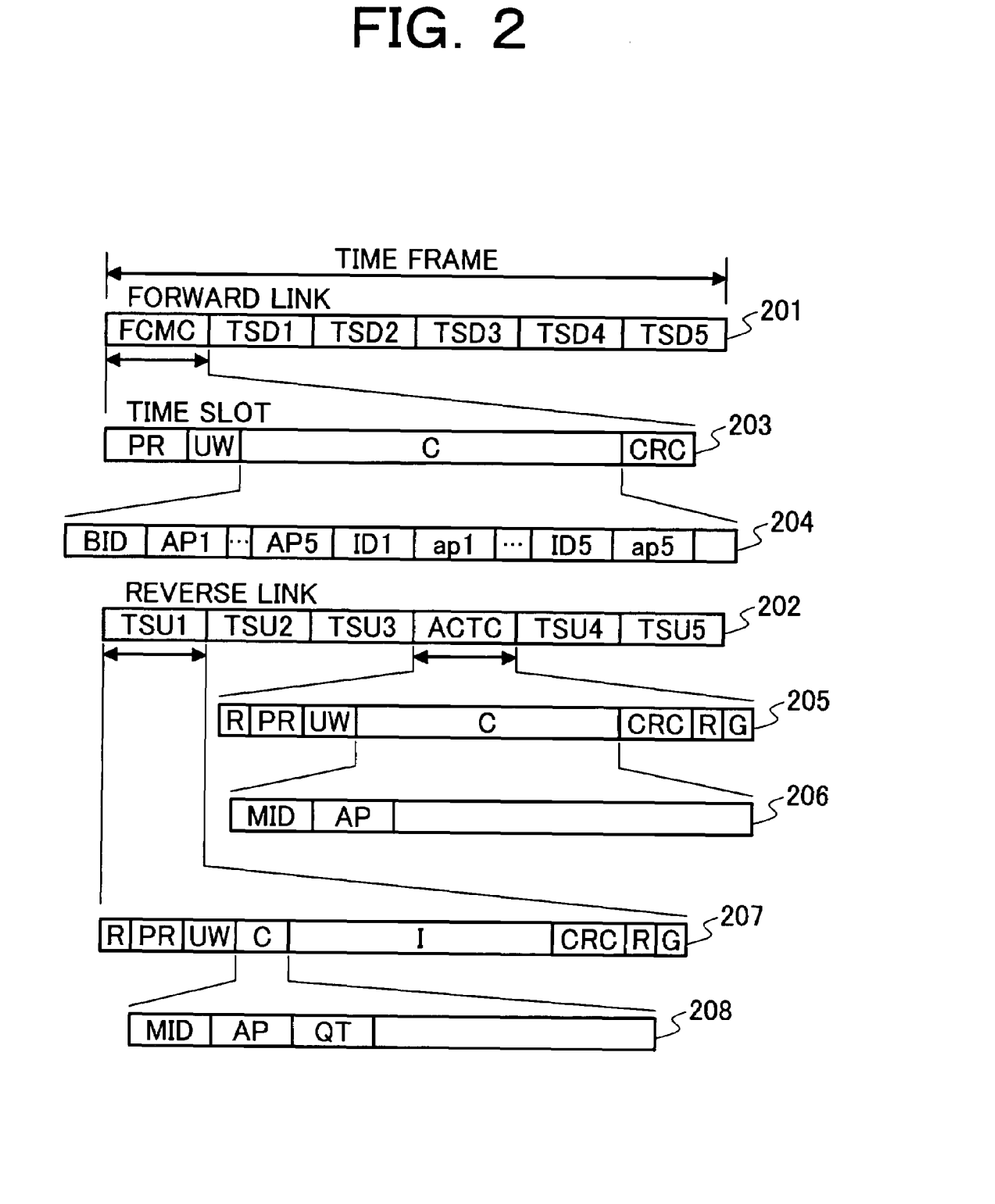
FIG. 2 is a diagram which shows examples of the structures of time frames/time slots used for embodying the invention.

FIG. 2 shows examples of the formats of radio transmission signal data to be transmitted between a base station and a mobile station in the embodiment of the present invention under the multi-application environment described above. In this example, one time frame has six time slots. For the forward link 201, the first time slot is used as a Frame Control Messagp Channel (FCMC) to send paging information from a base station. The remaining five time slots TSDL to TSDS are used as a Message Data Channel (MDC) for communication. For the reverse link 202, one time slot serving as an Activation Channel (ACTC) is assigned to a mobile station to access a base station. The remaining five time slots TSUL to TSU5 are used as the MDC for communication.

The FCMC 203 consists of a preamble (PR), a unique word (UW), control signal data (C), and cyclic redundancy check bits (CRC). The control signal data 204 includes a base station ID (BID), application discrimination words (AP1 to AP5), and MDC assignment information (ID1 to ID5 (mobile station ID) and ap1 to ap5 (application discrimination words)).

The ACTC 205 consists of a ramp (R), a preamble (PR), a unique word (UW), control signal data (C), data (I), cyclic redundancy check bits (CRC), and guard time (G). The control signal data 206 includes a mobile station ID (MID) and an application discrimination word (AP).

The MDC 207 to be transmitted over the reverse link consists of a ramp (R), a preamble (PR), a unique word (UW), control signal data (C), data (I), cyclic redundancy check bits (CRC), and guard time (G). The control signal data 208 includes a mobile station ID (MID), an application discrimination word (AP), and radio communication quality information, (QT). As the MDC example to be transmitted over the forward link, an MDC structure corresponding to that for the reverse link with the ramp and guard time being padded with preamble patterns is conceivable.

Next, examples of base station and mobile station configurations for embodying the present invention will be explained. First, the base station configuration will be explained with reference to FIG. 3. A base station has a transmission division, a receiving division, and a control division. The transmission division consists of an interface (IF) part 301, a channel coder (CHCOD) 302, a digital modulator (MOD) 303, a mixer 304, a power amplifier (PA) 30S, a duplexer (DUP) 306, and an antenna 307.

Figure 3:
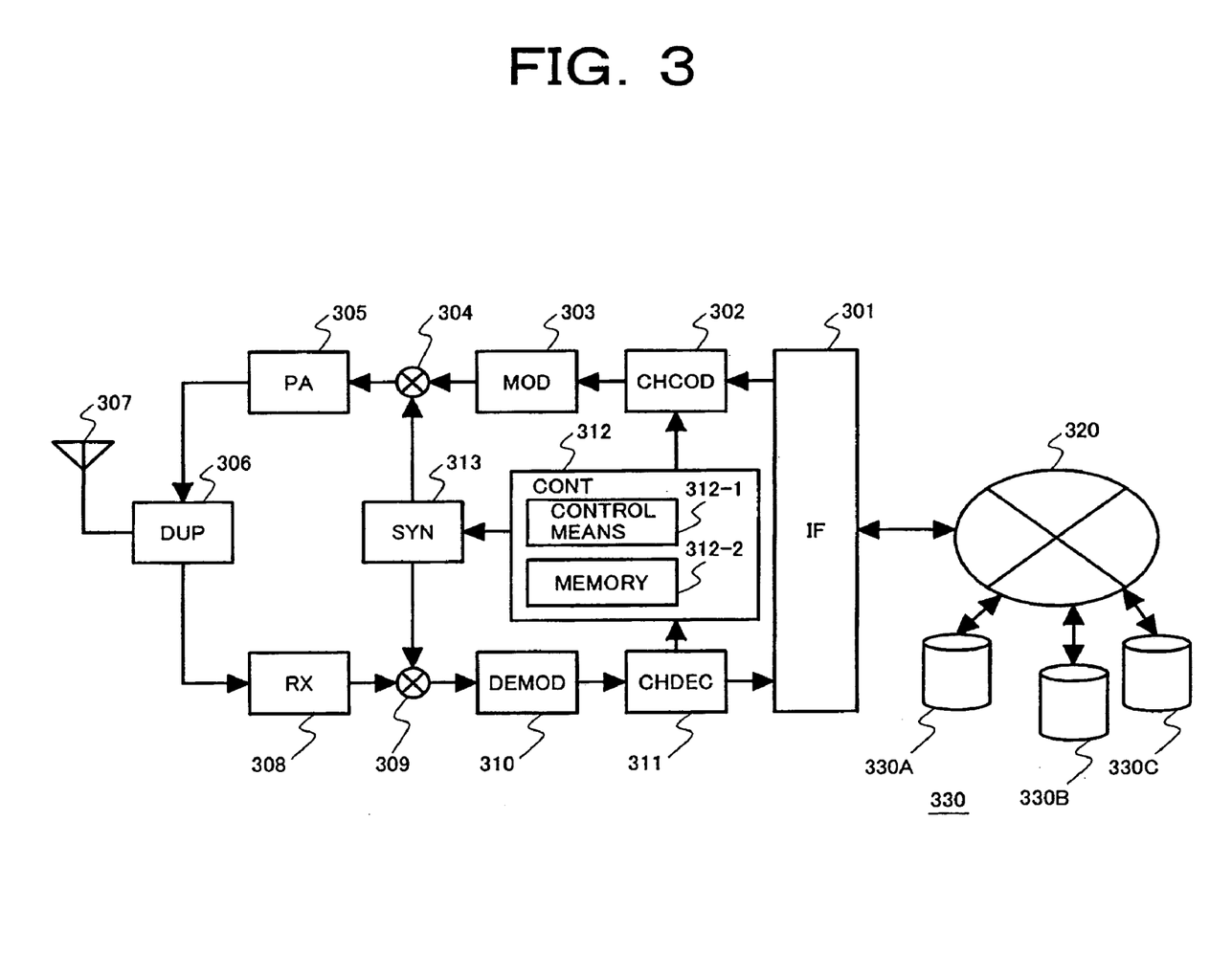
FIG. 3 is a block diagram of the base station used for embodying the invention.

Digital signals transmitted from one of the application (servers) centers 330 via an external wired network 320 are input through the interface part 301 and delivered to the channel coder 302. The channel coder 302 adds cyclic redundancy check bits and control signals produced from the control (CONT) part 312 to the digital signals and further executes multiplexing. The digital modulator 303 modulates the multiplexed digital signals and generates modulated digital signals. The modulated digital signals are mixed with transmitting frequency signals output from a frequency synthesizer (SYN) 313 in the mixer 304 and frequency converted to predetermined radio transmission signals. The radio transmission signals are amplified to a predetermined transmitting power by the power amplifier 305 and then transmitted via the duplexer 306 and antenna 307 to a mobile station.

The receiving division consists of the antenna 307, the duplexer 306, a receiving (RX) circuit 308, a mixer 309, a digital demodulator (DEMOD) 310, a channel decoder (CHDEC) 311, and, the interface part 301.

Radio signals emitted from a mobile station are input via the antenna 307 and duplexer 306 to the receiving circuit 308. The receiving circuit 308 amplifies the received radio signals. The thus amplified radio signals are mixed with receiving frequency signals output from the frequency synthesizer 313 in the mixer 309 and converted to received signals with a predetermined frequency. The received signals are demodulated by the digital demodulator 310 and converted to digital received signals. The channel decoder 311 separates the digital received signals into a predetermined number of time slots and executes error detection for each time slot. Control signal data in each time slot is delivered to the control part 312. Data in each time slot is sent via the interface part 301 and the wired network 320 to one of the application (servers) centers 330. The application (servers) centers 330 are not necessarily connected via the wired network 320 to the base station, but may be directly connected to the interface part 301. The application (servers) centers may be, for example, workstations on which a server program for a specific application runs.

The control division consists of the channel coder 302, the control part 312, the frequency synthesizer 313, and the channel decoder 311. The control part 312 is equipped with a control means 312-1 and a memory 312-2. The control part 312 instructs the channel coder 302 as to what time slot of the frame into which to encapsulate the data now obtained via the interface part 301. The control part 312 also instructs the channel decoder 311 as to what application (server) center to send the data in each time slot separated from the digital received signals over the interface part 301 and the wired network 320. At the same time, the control part 312 can obtain the result of error detection executed by the channel decoder 311. Furthermore, the control part 312 can instruct the frequency synthesizer 313 what transmitting/receiving frequencies are to be set.

Figure 4:
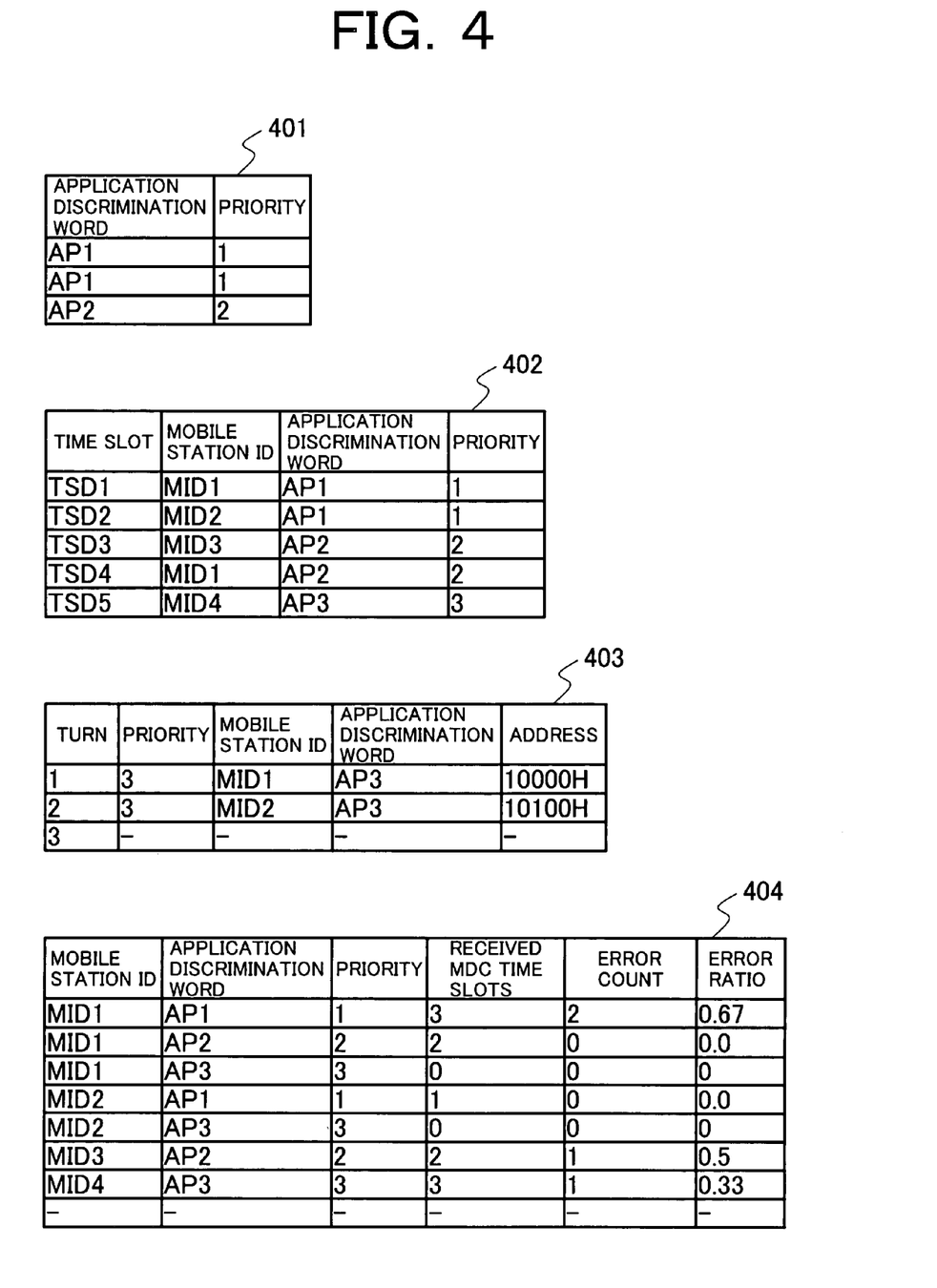
FIG. 4 is a diagram which shows examples of the time slot assignment database, the database for waiting database, and the radio communication quality database provided on the base station used for embodying the invention.

Now, examples of databases provided in the memory 312-2 of the above control part 312 will be explained with reference to FIG. 4. In FIG. 4, the tables of an application priority database 401, a time slot assignment database 402, a database for waiting data 403, and a radio communication quality database 404 are shown.

The application priority database 401 has data to be set under two entries: application discrimination word and priority. For an application for which the communication between a base station and a mobile station should be completed during the time the mobile station is located in the cell of the base station, to which the Inventor's attention was directed when the present invention was developed, its priority should be set high. The time slot assignment database 402 has time slots and data to be set under three entities: mobile station ID, application discrimination word, and priority, which are set for five time slots in this example, as many slots as used in the present embodiment of the invention. The database for waiting data 403 contains descriptions of waiting data, each to be set under its turn, priority, mobile station ID, application discrimination word, and address entries. The radio communication quality database 404 has mobile station IDs, application discrimination words, and data to be set entries: priority, received MDC time slots, error count, and error ratio, for each combination of mobile station ID and application.

Figure 5:
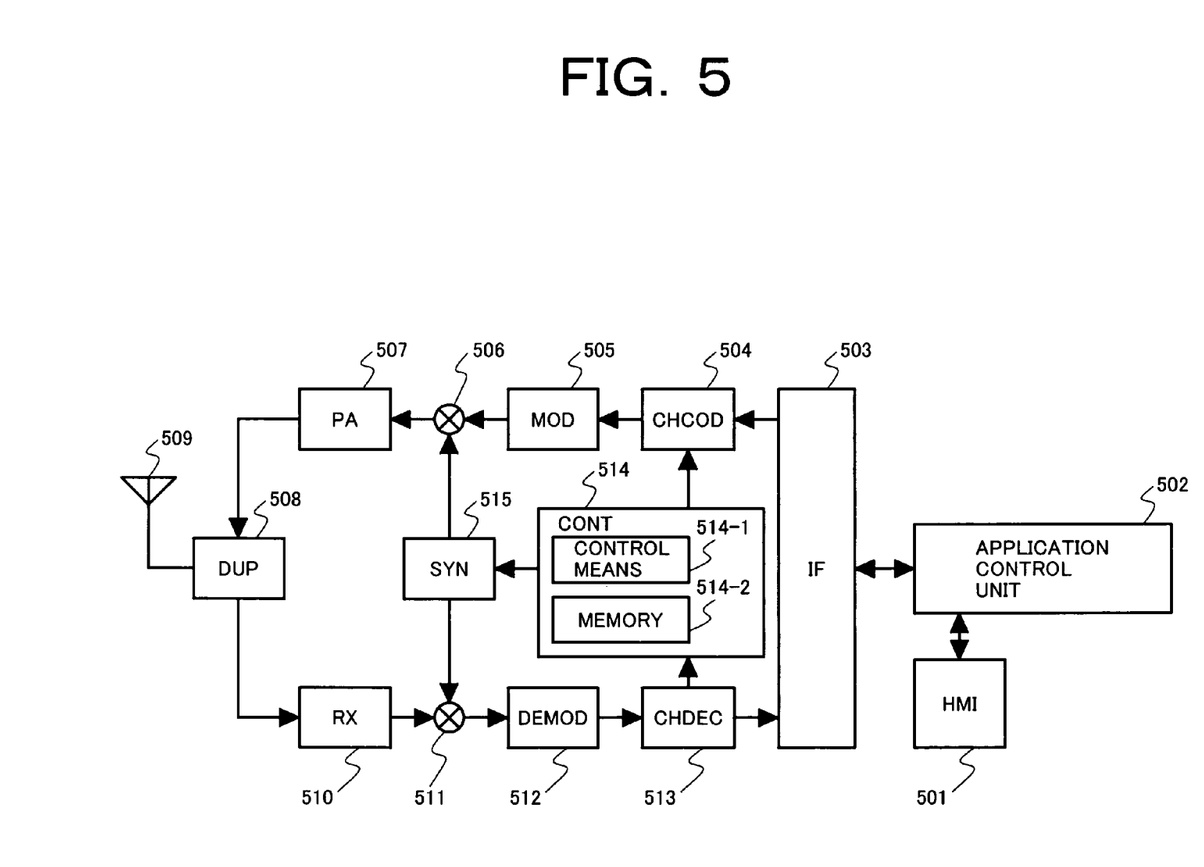
FIG. 5 is a block diagram of the mobile station used for embodying the invention.

Next, the mobile station configuration will be described with reference to FIG. 5. As in this case of the base station, the mobile station also has a transmission division, a receiving division, and a control division. The transmission division consists of an I/O part (HMI) 501, an application control unit 502, an interface (IF) part 503, a channel coder (CHCOD) 504, a digital modulator (MOD) 505, a mixer 506, a power amplifier (PA) 507, a duplexer (DUP) 508, and an antenna 509.

When the user selects an application via the I/O part 501, the application information is passed to the application control unit 502. According to the user-input data, the application control unit generates data to be transmitted and delivers this data to the channel coder 504 via the interface part 503. The channel coder 504 adds cyclic redundancy check bits and control signals produced from the control (CONT) part 514 to the data to be transmitted and executes multiplexing. The digital modulator 505 modulates the multiplexed digital signals and generates modulated digital signals. The modulated digital signals are mixed with transmitting frequency signals output from a frequency synthesizer (SYN) 515 in the mixer 506 and frequency converted to predetermined radio transmission signals. The radio transmission signals are amplified to a predetermined transmitting power by the power amplifier 507 and then transmitted via the duplexer 508 and antenna 509 to a base station.

The receiving division consists of the antenna 509, the duplexer 508, a receiving (RX) circuit 510, a mixer 511, a digital demodulator (DEMOD) 512, a channel decoder (CHDEC) 513, and the interface (IF) part 503.

Radio signals emitted from a base station are input via the antenna 509 and duplexer 508 to the receiving circuit 510. The receiving circuit 510 amplifies the received radio signals. The thus amplified radio signals are mixed with receiving frequency signals output from the frequency synthesizer 515 in the mixer 511 and converted to received signals with a predetermined frequency. The received signals are demodulated by the digital demodulator 512 and converted to digital received signals. The channel decoder 513 separates the digital received signals into a predetermined number of time slots and executes error detection for each time slot. Control signal data in each time slot is delivered to the control part 514. Data in each time slot is delivered via the interface part 503 to the application control unit 502. According to the delivered data contents, the application control unit 502 instructs the I/O part 501 to display the data contents if necessary.

The control division consists of the channel coder 504, the control part 514, the frequency synthesizer 515, and the channel decoder 513. The control part 514 is equipped with a control means 514-1 and a memory 514-2. The control part 514 instructs the channel coder 504 as to what time slot of the frame into which to encapsulate the data now obtained via the interface part 503. The control part 514 also instructs the channel decoder 513 to separate the digital received signals into time slots. The data in each time slot is delivered via the interface part 503 to the application control unit 502. At the same time, the control part 514 can obtain the result of error detection executed by the channel decoder 513. Furthermore, the control part 514 can instruct the frequency synthesizer 515 which transmitting/receiving frequencies are to be set.

As is the case with the base station, in the mobile station as well, a time slot assignment database and a database for waiting data exist in the memory 514-2 of the control part 514. These databases have basically the same structure as those for the base station, shown in FIG. 4, except that the mobile station ID entry does not exist because the mobile station communicates with one base station at a time.

Figure 6:
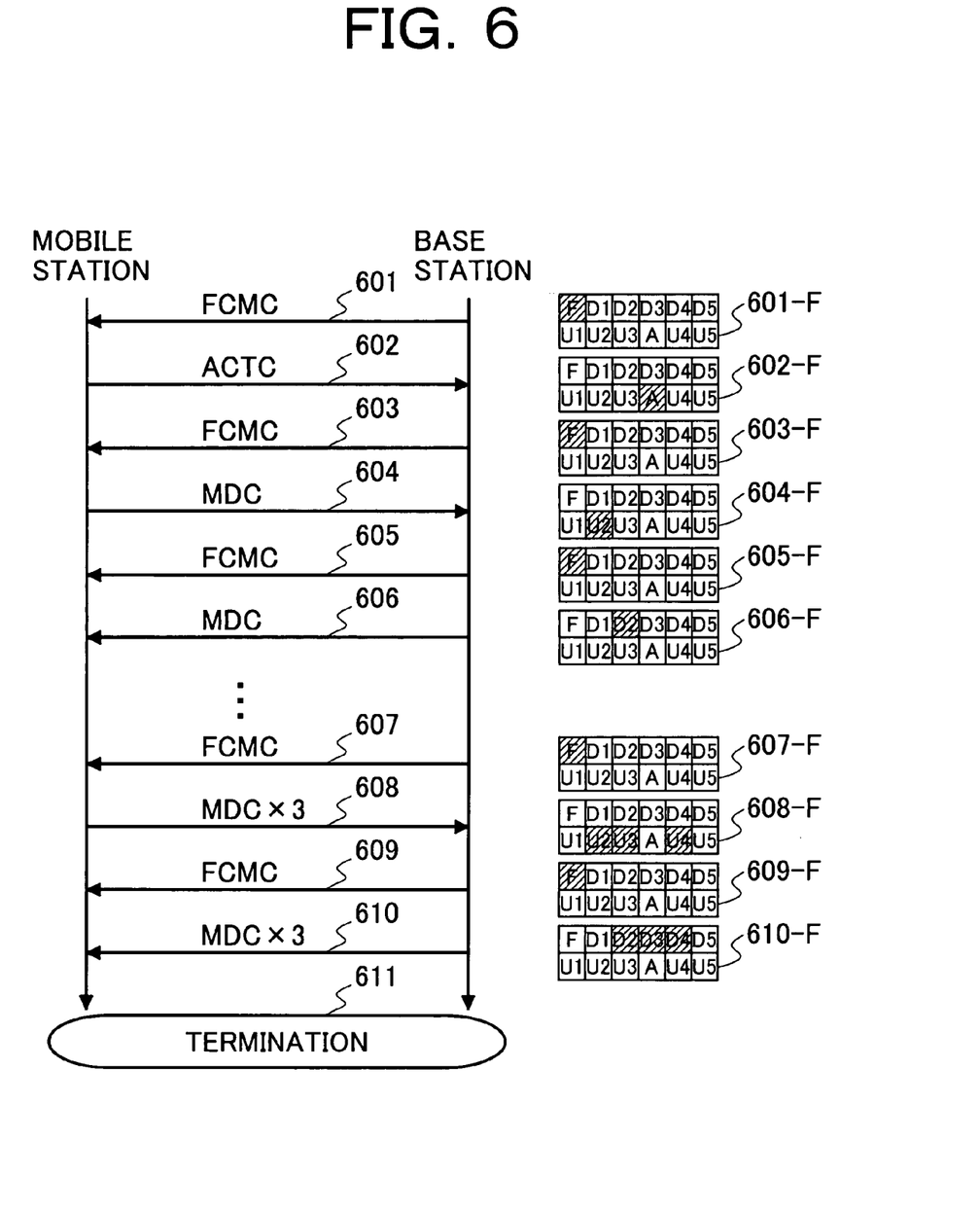
FIG. 6 is a diagram which illustrates an example of the connection and communication sequence between the base station and the mobile station for embodying the invention.

Next, an example of how a communication sequence between a base station and a mobile station is implemented in accordance with the present invention will be explained with reference to FIG. 6. On the right side of FIG. 6, frames 601-F to 610-F that are transferred between the base station and the mobile station are shown, in which the shaded time slots are those used by the present invention. In each frame representation, the time slots are marked: F for FCMC, time slot, D1 to D5 for TSDL to TSDS time slots, A for ACTC time slot, and U1 to US for TSUL to TSUS time slots.

The base station always sends paging information to mobile stations locating in its cell, using FCMC 601. The paging information contains the base station ID, information on available applications, and radio channel assignment information. A moving mobile station determines that it has entered the cell of the base station by decoding the contents of the FCMC 601. When the mobile station is going to begin communication with the base station, it issues a connection request to the base station by using ACTC 602. The ACTC 602 includes the mobile station ID and the object application discrimination word. Based on the requested application information from the mobile station, the base station obtains the priority information on the application from the application priority database 401. Then, the control means 312-1 of the base station determines the MDC assignment for the communication, according to the information as to the time slots and the applications to be used. The result of the above assignment is stored into the above-mentioned time slot assignment database 402. According to the priority information, the data which is judged to be impossible to transmit in the present frame is stored into the above-mentioned database for waiting data 403, and this data will be transmitted in the next frame and subsequent frames. Using the FCMC 603 at the beginning of the next frame, the base station broadcasts time slot assignment information to all mobile stations in its cell. The contents of this information include IDs of active mobile stations, applications used by the mobile stations, and time slots assigned to the mobile stations. Based on the information contents in the FCMC 603 as received, the mobile station sends the data encapsulated in the specified MDC 604. On receiving this data, the base station sends back a reply to the data contents encapsulated in the MDC 604 as received from the mobile station. Before sending this reply, the base station notifies the mobile station of the transmission time slot number assigned to the mobile station by sending FCMC 605. The mobile station knows which MDC 606 to receive from the FCMC 605 received from the base station. If the radio communication quality of the channel between the base station and the mobile station is good, the above sequence from the FCMC 603 transmission to the MDC 606 transmission is repeated.

Now, a case where the radio communication quality of the channel is not good will be explained. Based on the above priority information, the base station judges whether the communication with a mobile station should be completed during the time the mobile station is located in its cell. In addition, both the mobile station and base station have a means for measuring the radio communication quality of the channel therebetween. A conceivable method of measuring the radio communication quality is by calculating the time slot error rate for a regular period. The mobile station performs the radio communication quality measurement of the forward link from the base station and notifies the base station of the result of measurement by using the MDC. On the other hand, the base station performs the radio communication quality measurement of the reverse link from the mobile station. After these radio communication quality measurements of both reverse and forward links are performed, if a predetermined quality is not satisfied, the base station uses FCMC 607 and notifies the mobile station that a plurality of MDCs for the reverse link are being assigned to the mobile station. In this case, the assigned MDCs 608 carry the same contents. If at least one of the MDCs 608 operates to correctly carry the contents to the base station, the base station judges it successful, and thus the throughput is enhanced. On the other hand, for the forward link, similarly, the base station uses FCMC 609 and notifies the mobile station that a plurality of MDCs for the forward link are being assigned to the mobile station. In this case, the assigned MDCs 610 carry the same contents. If at least one of the MDCs 610 operates to correctly carry the contents to the mobile station, the mobile station judges it successful and thus the throughput is enhanced.

Figure 7:
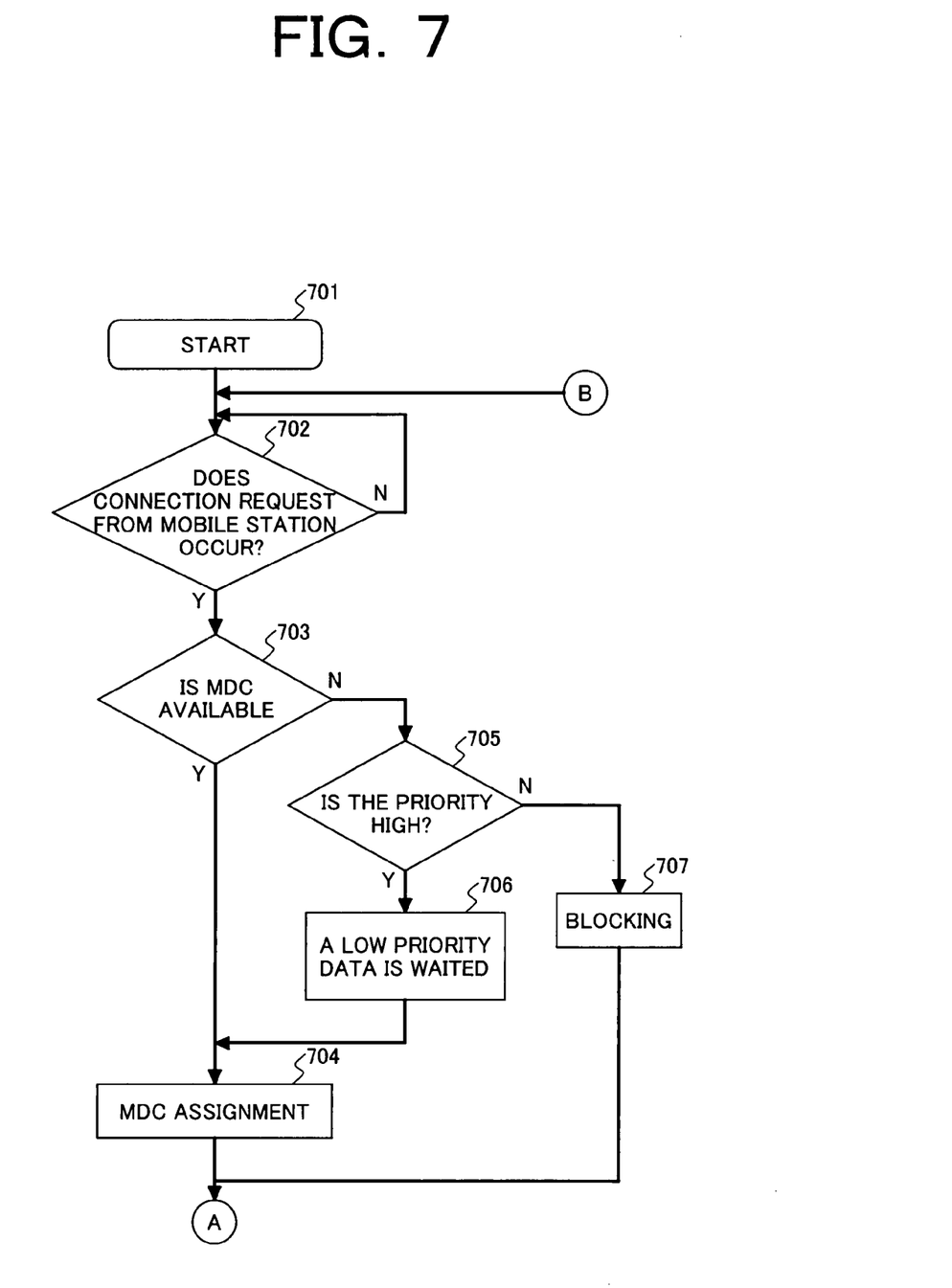
FIG. 7 is a flowchart of the sequence of operation to be performed by the base station, occasioned by a connection request from a mobile station, which is intended to illustrate an example of the invention.
Figure 8:
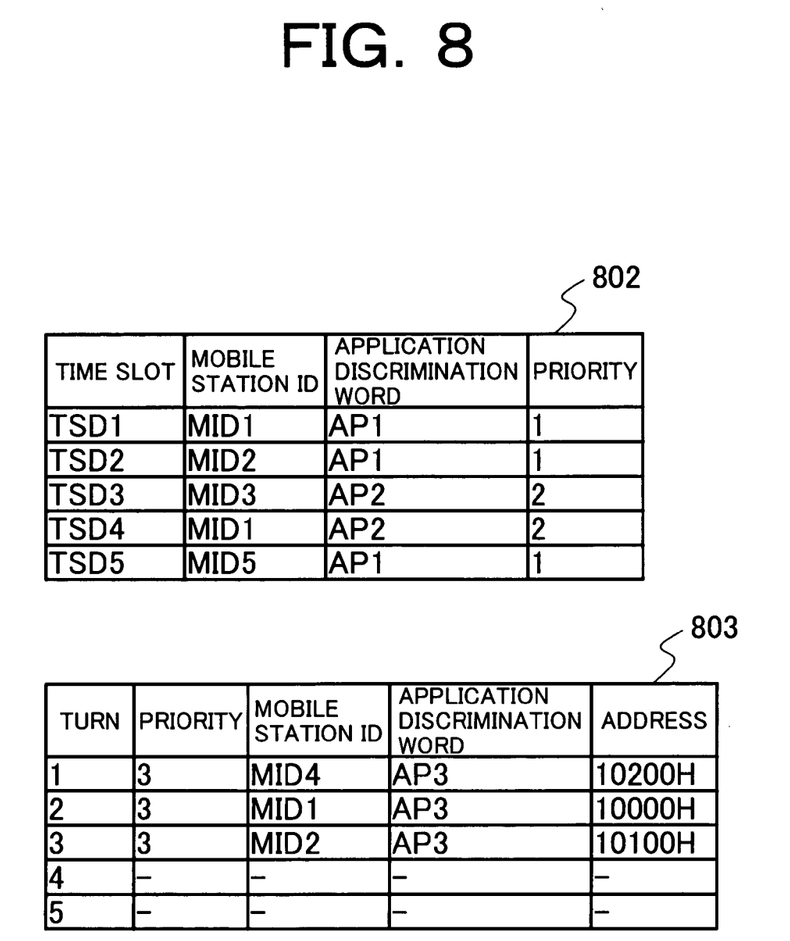
FIG. 8 is a diagram which shows a second example of the time slot assignment database and the database for waiting data provided on the base station used for embodying the invention.

Next, the sequence of operation to be performed by the base station only, occasioned by receipt of a connection request from a mobile station, will be explained with reference to FIG. 7. Upon being powered on, the base station starts its operation (701). By receiving ACTC, the base station knows whether a connection request from a mobile station occurs (702). The connection request ACTC includes the mobile station ID and the application discrimination word of the object application for which the mobile station requests a connection. If the connection request from a mobile station occurs, the base station obtains the priority information on the application from the application priority database 401 and then checks the MDC assignments and the number of free MDCs in the next frame by referring to the above-mentioned time slot assignment database (703). For example, assume that the time slot assignment database is as shown in FIG. 4 at this time (without free MDCS). If there are a number of free MDCs equal to or more than the number of MDCs required by the mobile station, the base station assigns as many MDCs as required to the mobile station (704). If the number of free MDCs are less than the number of MDCs required by the mobile station, the mobile station executes a priority judgment.(705). Among the MDCs to be assigned to other mobile stations in the next frame, if there is a MDC for an application of lower priority than the priority of the application called by the mobile station in question, it is freed and reassigned to the mobile station. The data for a lower priority application, released from that MDC, is saved in the base station and stored in the database for waiting data 403 and will be transmitted in a suitable MDC in subsequent frames (706). Database examples reflecting this case are shown in FIG. 8. The assignment database shown in FIG. 4 includes the MDC (time slot TSDS) assigned to the MID 4 mobile station. Because of the occurrence of a new connection and channel assignment request from the MIDS mobile station of application priority 1, the above MDC for a lower priority application is freed and reassigned to the MID5 mobile station. Then, the data for MID4, released from that MDC, is stored into the database for waiting data 803. If there is no MDC for a lower priority application, blocking occurs (707). The mobile station that has been notified that its connection request has been rejected due to blocking will retry the request by using another ACTC in the next frame and subsequent frames.

Figure 9:
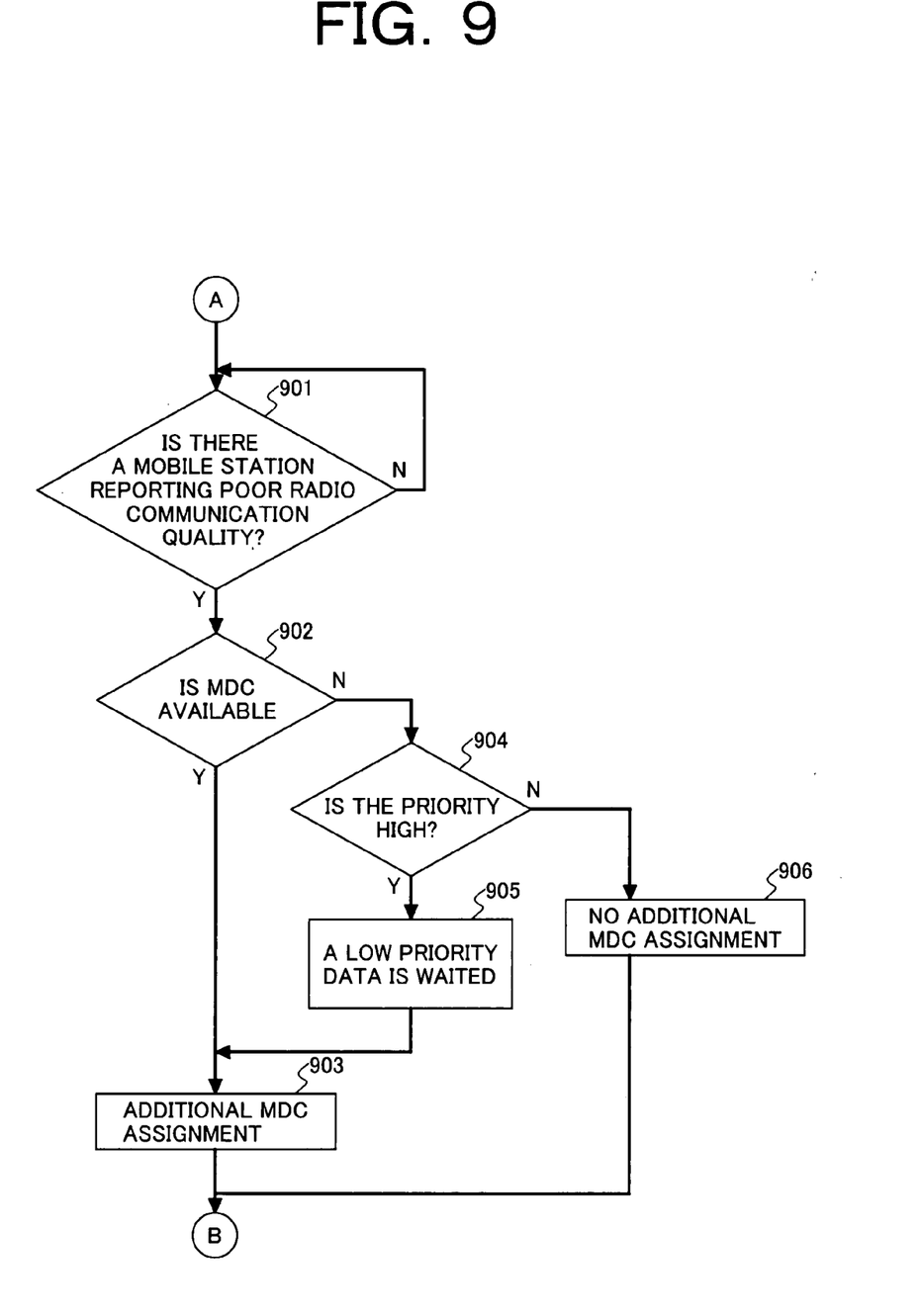
FIG. 9 is a flowchart of the sequence of operation to be performed by the base station, occasioned by poor radio communication quality, which is intended to illustrate an example of the invention.

Next, the sequence of operations to be performed by the base station only, occasioned by poor radio communication quality occurring during the communication with a mobile station, will be explained with reference to FIG. 9.

Figure 10:
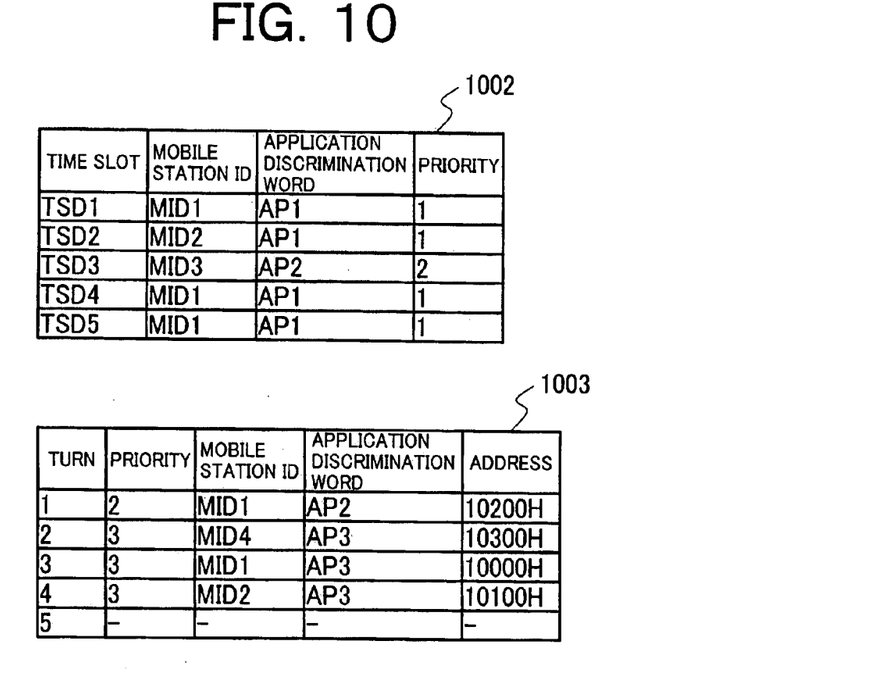
FIG. 10 is a diagram which shows a third example the time slot assignment database and the database for waiting data provided on the base station used for embodying the invention.

The base station monitors the MDCs used for ongoing communications with mobile stations to see whether a mobile station reports poor radio communication quality and to make sure that the MDCs received there maintain a predetermined radio communication quality (901). If there is a MDC not satisfying the predetermined quality, the base station determines whether free MDCs required to transmit the same contents as the MDC contents are available at the next MDC scheduling (902). If there are the required number of free MDCS, additional MDC assignments to the mobile station are performed for transmission of the same contents (903). If the required number of MDCs are not available, the application priority of the MDC in question is compared with that of another MDC scheduled to be transmitted to another mobile station in the same frame. For example, assume that the time slot assignment database is as shown in FIG. 4 at this time (without free MDCS). If a MDC for a lower priority application exists, it is freed and reassigned to the mobile station in question; a plurality of such MDCs may be reassigned. The data for lower priority application, released from the MDC is saved and stored into the above-mentioned database for waiting data 403 (905). A plurality of MDCs for a higher priority application, including the reassigned MDCs into which the same contents are encapsulated, are transmitted (903). In the present embodiment of the invention, three MDCs having the same contents are transmitted. Database examples reflecting this case are shown in FIG. 10. The assignment database shown in FIG. 4 includes the MDCs (time slots TSD4 and TSD5) assigned to the MID1 mobile station (AP2) and the MID4 mobile station (AP3) which have a lower application priority. Because of the poor radio communication quality of the channel assigned to the MID1 mobile station of application priority 1 (for example, a threshold as the criterion of poor radio communication quality is set at an error ratio of 0.6 in the quality database shown in FIG. 4), the above two MDCs are reassigned to the MID1 mobile station for AP1. Then, the data released from these MDCs is stored into the database for waiting data. At the receiving end, after error detection, an MDC without errors, out of the received multiple MDC time slots of the same contents, is used. If there is no MDC for a lower priority application, the transmission of the same contents in multiple MDC time slots cannot be performed (907).

Although the present embodiment of the invention is assumed to be based on the TDMA method, the invention can easily be applied to other methods, such as CDMA, FDMA, and OFDM. For the CDMA method, channels provided in codes may be used instead of the channels provided in time slots. For the FDMA method, channels provided in frequencies may be used instead of the channels provided in time slots. For the OFDM method, one channel may comprise a small number of sub-carriers of the channels provided in time slots.

Although the above embodiment is directed to a case where the service area for toll collection application is defined as the cell of only one base station, another embodiment is possible where the service area has a plurality of cells of base stations, as will be described below.

Figure 11:
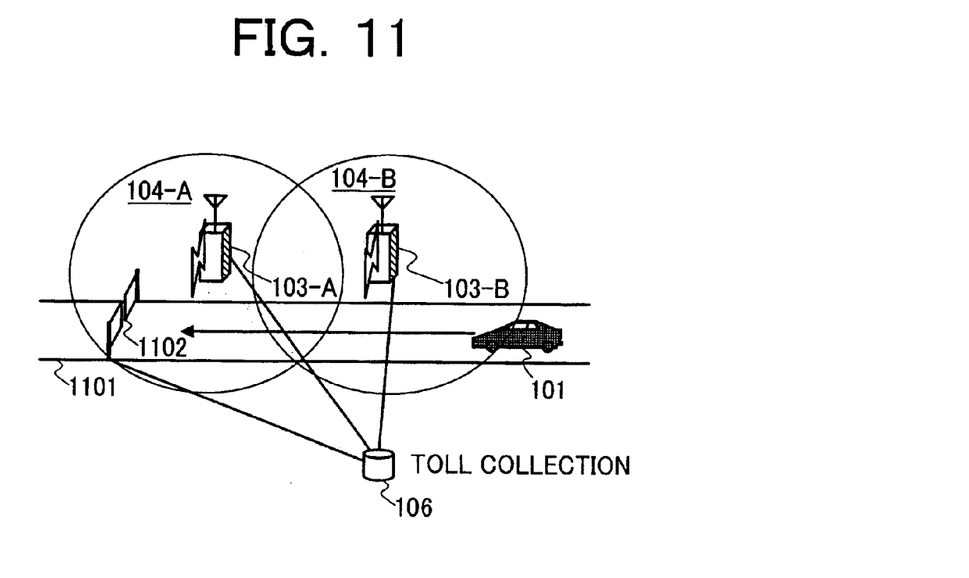
FIG. 11 is a diagram of the digital radio communication system of the present invention with a service area having a plurality of cells.

FIG. 11 shows an example of a case where two cells provide the service area for toll collection application. Although the descriptions of other application services are omitted in FIG. 11 for simplification, of course, the system is configured to offer multi-application services. Although two cells are shown in FIG. 11, the present invention can easily be applied to an extended service area having three or more cells.

In the system configuration example shown in FIG. 11, a mobile station is mounted on a motor vehicle 101. Two base stations 103-A, B offer the toll collection application. The two base stations 103-A, B each have corresponding cells 104-A, B. A toll collection application server 106 is connected to the base stations 103-A, B and can offer its service only in the cells 104-A, B of the base stations. The motor vehicle 101 is assumed to move on a road 1101 in the arrow direction. Upon the completion of a communication for the above toll collection application service, a gate 1102 opens, and the vehicle can go forward. If the service area that is provided by one cell is small, it is advisable to configure the system in this way so that the service of the same application can be offered in a plurality of cells.

The advantage of this system configuration of the present invention, where the service area has a plurality cells, is that different settings of the priority of the application can be assigned to the cells.

Figure 12:
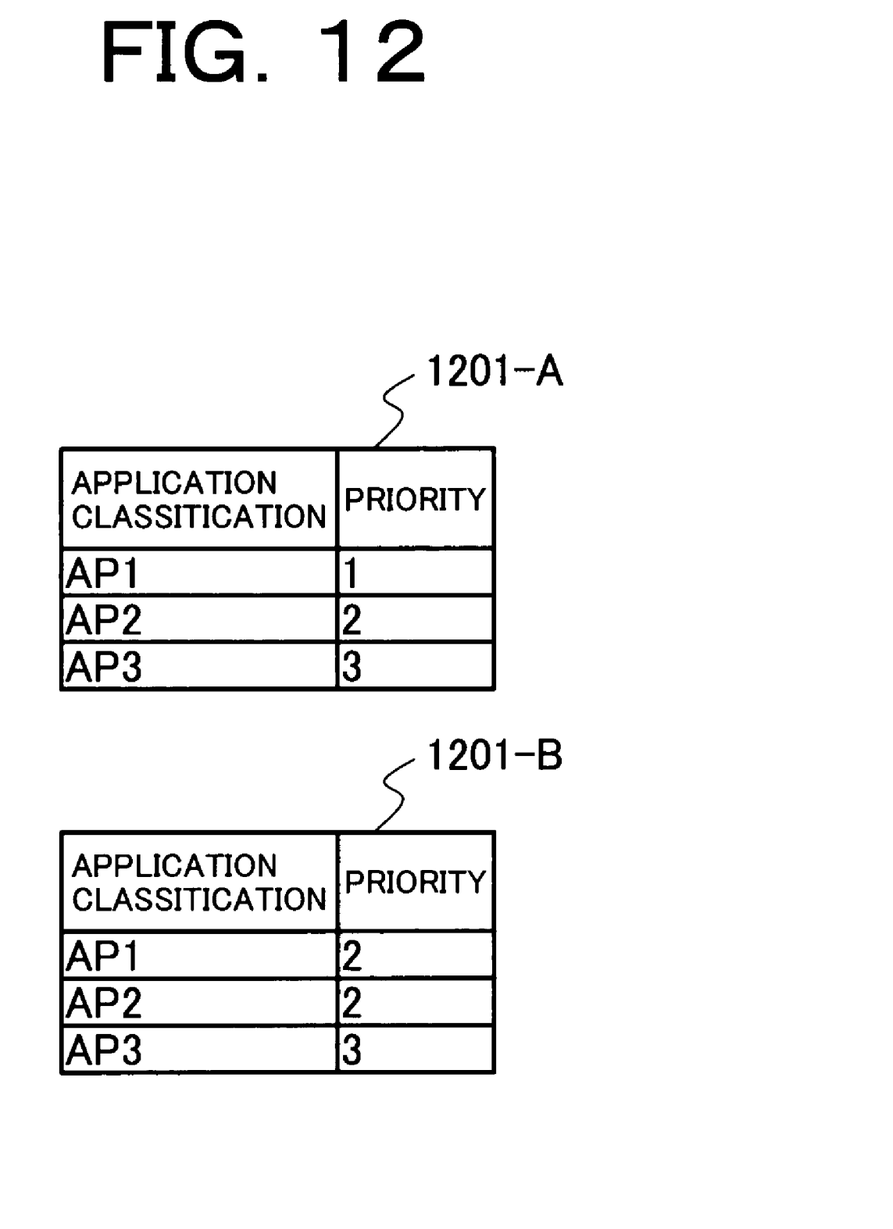
FIG. 12 is a diagram which shows another example of an application priority database examples for the base stations used for embodying the invention.

It is supposed that some motor vehicle moves to the position of the gate 1102 without completing a communication between its mobile station and the base stations. As means to further reduce the probability of the motor vehicle having to stop in the front of the gate 1102, it is conceivable that the priority of the application is set higher in the cell of the base station nearer to the gate 1102. With reference to FIG. 12, this method of implementation will be explained. The toll collection application is represented as AP1 in FIG. 12. The priority of the application in the application priority database on the base station 103-B with the cell 104-B rather far from the gate 1102 is set at 2. On the other hand, the priority of the application in the application priority table on the base station 103-A with the cell 104-A nearer to the gate 1102 is set at 1. Thus, the application is handled preferentially with a priority of 1in the cell 104A, whereas it is handled with a priority of 2 in the cell 104-B.

In a radio communication system for multi-applications, even if the traffic across the system is heavy, the present invention makes it possible to assign a radio communication channel preferentially to a mobile station that is to communicate with a base station and complete the communication during its stay in the cell of the base station. Even if the radio communication quality of a channel becomes poor, the invention can increase the throughput of the communication by assigning a plurality of MDCs into which the same contents are encapsulated for transmission/reception to the mobile station using that channel. The invention can decrease the rate of uncompleted communication between a mobile station and a base station while the mobile station is located in the cell of the base station.

The present invention is not limited to the above embodiments and various changes and modifications can be made within the spirit and scope of the present invention. Therefore, to appraise the public of the scope of the present invention, the following claims are made.

What is claimed is:

1. A digital radio communication system for multi-applications comprising:
    a base station; and
    a plurality of mobile stations,
    wherein the mobile stations send the base station signal data of a radio channel assignment request including a code representing an application to be offered over a radio communication channel;
    wherein the base station comprises:
    means for distinguishing priority of the application based on the code representing the application included in said signal data of the radio channel assignment request sent from the mobile stations, and
    means for assigning one radio communication channel or a plurality of radio communication channels to the mobile stations, based on said priority, according to said signal data of the radio channel assignment request sent from the mobile stations,
    wherein at least either said base station or each mobile station comprises a function of measuring radio communication quality of the radio communication channel therebetween;
    wherein the base station further comprises:
    means for implementing, if a predetermined radio communication quality is not attained in a radio communication channel being used for a higher priority application, reassignment of a new radio communication channel to the mobile station using that channel so that same contents will be transmitted over a plurality of radio communication channels including a pre-assigned radio communication channel and the new radio communication channel in a regular period, wherein the system further comprises means for implementing in a specific application service area, including two or more contiguous cells, different settings of radio channel assignment priority of the application in the cells, according to a cell position along a direction in which mobile stations normally move.

2. A digital radio communication system for multi-applications comprising:
a base station; and
a plurality of mobile stations,
wherein the mobile stations send the base station signal data of a radio channel assignment request including a code representing an application to be offered over a radio communication channel,
wherein the base station comprises:
means for distinguishing priority of the application based on the code representing the application included in said signal data of the radio channel assignment request sent from the mobile stations, and
means for assigning one radio communication channel or a plurality of radio communication channels to the mobile stations, based on said priority, according to said signal data of the radio channel assignment request sent from the mobile stations,
wherein at least either said base station or each mobile station comprises a function of measuring radio communication quality of the radio communication channel therebetween;
wherein the base station further comprises:
means for implementing, to implement that if a predetermined radio communication quality is not attained in a radio communication channel being used for a higher priority application, reassignment of a new radio communication channel to the mobile station so that same contents will be transmitted over a plurality of radio communication channels including a pre-assigned radio communication channel and the new radio communication channel in a regular period,
wherein said radio communication channels are provided in time slots by time division, and
wherein the system further comprises means for implementing in a specific application service area, including two or more contiguous cells, different settings of radio channel assignment priority of the application in the cells, according to a cell position along a direction in which mobile stations normally move.

* * * * *